US010855550B2

United States Patent
Nikkhah et al.

(10) Patent No.: US 10,855,550 B2
(45) Date of Patent: Dec. 1, 2020

(54) NETWORK TRAFFIC PREDICTION USING LONG SHORT TERM MEMORY NEURAL NETWORKS

(71) Applicant: Cisco Technology, Inc., San Jose, CA (US)

(72) Inventors: Mehdi Nikkhah, San Jose, CA (US); Preethi Natarajan, Los Gatos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 663 days.

(21) Appl. No.: 15/352,938

(22) Filed: Nov. 16, 2016

(65) Prior Publication Data

US 2018/0137412 A1   May 17, 2018

(51) Int. Cl.
*H04L 12/24* (2006.01)
*H04L 12/26* (2006.01)
*G06N 3/08* (2006.01)
*G06N 3/04* (2006.01)

(52) U.S. Cl.
CPC ......... *H04L 41/147* (2013.01); *G06N 3/0445* (2013.01); *G06N 3/084* (2013.01); *H04L 41/0896* (2013.01); *H04L 41/16* (2013.01); *H04L 43/0894* (2013.01); *H04L 43/067* (2013.01)

(58) Field of Classification Search
CPC .. G06N 3/08; G06N 3/04; G06N 3/02; G06N 20/00; G06N 5/04; H04L 41/0896; H04L 41/147; H04L 41/16; H04L 43/067; H04L 43/0894; H04L 43/0876; H04L 45/70; H04L 47/11; H04L 47/225
See application file for complete search history.

(56) References Cited

U.S. PATENT DOCUMENTS

| | | | | |
|---|---|---|---|---|
| 6,125,105 | A | * | 9/2000 | Edwards ................ G06Q 10/06 370/230 |
| 6,272,110 | B1 | | 8/2001 | Tunnicliffe et al. |
| 8,352,392 | B2 | | 1/2013 | Swift et al. |
| 8,811,427 | B2 | | 8/2014 | Mogre et al. |
| 9,208,798 | B2 | | 12/2015 | Ward et al. |
| 9,336,483 | B1 | * | 5/2016 | Abeysooriya ............ G06N 3/08 |
| 2007/0189298 | A1 | | 8/2007 | Wong et al. |

(Continued)

OTHER PUBLICATIONS

Graves et al. "Framewise Phoneme Classification with Bidirectional LSTM Networks", IJCNN, 2005, pp. 2047-2052.*

(Continued)

*Primary Examiner* — Li Wu Chang
(74) *Attorney, Agent, or Firm* — Edell, Shapiro & Finnan, LLC

(57) ABSTRACT

A server uses an LSTM neural network to predict a bandwidth value for a computer network element using past traffic data. The server receives a time series of bandwidth utilization of the computer network element. The time series includes bandwidth values associated with a respective time values. The LSTM neural network is trained with a training set selected from at least a portion of the time series. The server generates a predicted bandwidth value associated with a future time value based on the LSTM neural network. The provisioned bandwidth for the computer network element is adjusted based on the predicted bandwidth value.

17 Claims, 10 Drawing Sheets

(56) References Cited

U.S. PATENT DOCUMENTS

| | | | | |
|---|---|---|---|---|
| 2009/0113049 A1* | 4/2009 | Nasle | ............... | G05B 13/026 709/224 |
| 2012/0066163 A1* | 3/2012 | Balls | ............... | C12Q 1/6886 706/21 |
| 2015/0317589 A1* | 11/2015 | Anderson | ............ | G06Q 10/08 705/7.25 |
| 2015/0371151 A1* | 12/2015 | Georgescu | ............ | G06N 20/00 706/12 |
| 2016/0247065 A1* | 8/2016 | Nasle | ............... | G06N 20/00 |
| 2017/0061329 A1* | 3/2017 | Kobayashi | ............ | G06N 20/00 |
| 2017/0103312 A1* | 4/2017 | Henry | ............... | G06F 15/82 |
| 2017/0255832 A1* | 9/2017 | Jones | ............... | G06K 9/00718 |
| 2018/0060720 A1* | 3/2018 | El-Khamy | ............ | G06N 3/0445 |
| 2018/0082197 A1* | 3/2018 | Aravamudan | ....... | G06F 17/2785 |
| 2018/0129937 A1* | 5/2018 | Bradbury | ............. | G06F 17/16 |
| 2018/0137349 A1* | 5/2018 | Such | ................ | G06K 9/6273 |

OTHER PUBLICATIONS

Wawan et al. "Dynamic Bandwidth Management Based on Traffic Prediction Using Deep Long Short Term Memory", ICSITech, Oct. 2016, pp. 318—326.*

Graves et al. "Framewise Phoneme Classification with Bidirectional LSTM and Other Neural Network Architectures", Neural Networks 18, 2005, pp. 602-610.*

Gers, "Long Short-Term Memory in Recurrent Neural Networks," Doctoral dissertation, Universität Hannover, Jan. 2001, 102 pages.

Salehinejad, "Learning Over Long Time Lags," arXiv preprint arXiv:1602.04335, Feb. 2016, 16 pages.

W. Yoo, et al., "Network Bandwidth Utilization Forecast Model on High Bandwidth Networks", 2015 International Conference on Computing, Networking and Communications (ICNC), Feb. 16-19, 2015, Garden Grove, CA, 5 pages.

B. Krithikaivasan, et al., "ARCH-Based Traffic Forecasting and Dynamic Bandwidth Provisioning for Periodically Measured Nonstationary Traffic", IEEE/ACM Transactions on Networking, vol. 15, No. 3, Jun. 2007, 14 pages.

A. Eswaradass, et al., "A Neural Network Based Predictive Mechanisms for Available Bandwidth", Proceedings of the 19th IEEE International Parallel and Distributed Processing Symposium (IPDPS '05), Apr. 4-8, 2005, Denver, CO, 10 pages.

S. Hochreiter, et al., "Long Short-Term Memory", Neural Computation 9(8):1735-1780, Nov. 1997, 32 pages.

* cited by examiner

NETWORK TRAFFIC PREDICTION USING LONG SHORT TERM MEMORY NEURAL NETWORKS

TECHNICAL FIELD

The present disclosure relates to time series prediction using neural network models.

BACKGROUND

In enterprise and service provider networks, network administrators adjust the provisioning of capacity to prevent unnecessary congestion in networks while ensuring users avoid packet drops caused by insufficient bandwidth. An accurate prediction of future bandwidth requirements generated by looking at past bandwidth usage, utilization or other network traffic data allows network administrators to provide adequate provisioning for users, while avoiding the costs of overprovisioning network resources that are not necessary during a particular time period.

DESCRIPTION OF EXAMPLE EMBODIMENTS

Overview

A computer-implemented method is provided for a server to predict a bandwidth value for a computer network element using past traffic data using an LSTM neural network. The method comprises receiving a time series of bandwidth utilization of the computer network element. The time series comprises a plurality of bandwidth values each associated with a respective time value. An LSTM neural network is trained with a training set comprising at least a portion of the time series. The server generates a predicted bandwidth value associated with a future time value based on the LSTM neural network. The provisioned bandwidth for the computer network element is adjusted based on the predicted bandwidth value.

DETAILED DESCRIPTION

Presented herein are techniques based on Long Short Term Memory (LSTM) neural networks that are also capable of forgetting. This is a special case of a recurrent neural network, which is capable of finding longer-term dependencies between data points in a sequence. This method may be used in other use cases, such as next word prediction for search engines, but the techniques described herein use an LSTM in the context of predicting network traffic characteristics such as capacity or utilization. In particular, an LSTM neural network is trained on a set of data points (e.g., historic traffic utilization data) and then used for a series of one-step predictions on a test set of data points.

Past attempts to provide an accurate model include decomposition of the input data, such as Seasonal and Trend decomposition using Loess (STL), which has been used with an Autoregressive Integrated Moving Average (ARIMA) model to predict network bandwidth utilization in high bandwidth networks. The STL methods remove seasonality and trends from the input data (e.g., the time series of network traffic utilization), which allows the ARIMA model to find the next point in the remainder of the time series (i.e., when seasonal and trend factors are subtracted from the original time series). Other statistical models for predicting network traffic utilization may be based on Autoregressive Conditional Heteroskedasticity (ARCH) models.

Another approach is to use neural networks for prediction of bandwidth utilization. Recurrent neural networks are distinct from other neural networks in that they include a feedback loop, which enables them to learn state spaces. However, keeping the memory for a long period of time is difficult due to vanishing gradients or exploding gradients. In other words, in the back propagation phase of a neural network, weight matrices might end up being multiplied several times, which can result in a gradient parameter becoming extremely small or large.

Figure 1:
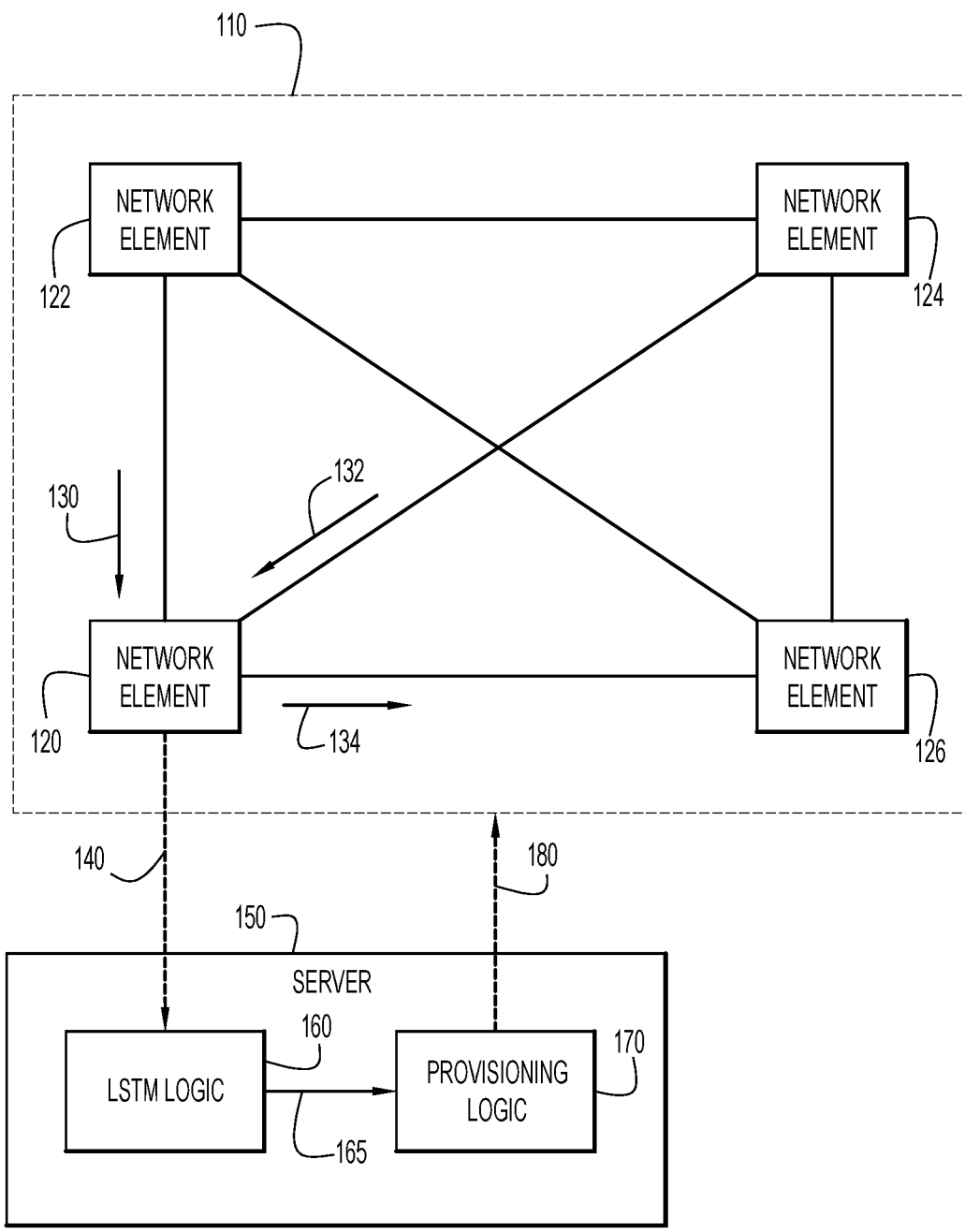
FIG. 1 is a simplified block diagram of a system to predict network utilization in a computer network, according to an example embodiment.

Referring now to FIG. 1, a simplified block diagram of a network traffic prediction system 100 is shown. A computer network 110 comprises a plurality of network elements, including network elements 120, 122, 124, and 126. Network element 120 receives traffic 130 and traffic 132 from network elements 122 and 124, respectively, while sending traffic 134 to the network element 126. Collectively, the traffic 130, 132, and 134 define the traffic utilization 140 of the network element 120. The traffic utilization data 140 may be sampled at a predetermined rate to form a time series with each value of total traffic associated with a time value. In one example, the time values of the time series are evenly spaced (e.g., every five minutes).

The network element 120 sends the traffic utilization data 140 to a server 150 that is configured to predict future bandwidth needs of the network element 120. The server 150 processes the traffic utilization data 140 with LSTM logic 160 to generate a predicted bandwidth 165 that the network element 120 will require at one or more points in the future. The LSTM logic 160 may be embodied in specialized electronic hardware connected to the server 150. Alternatively, the LSTM logic 160 may be embodied as software resident in the memory of the server 150. Provisioning logic 170 processes the predicted bandwidth 165 and sends a provisioning request 180 to the network 110 (e.g., a network controller). The network 110 uses the provisioning request 180 to adjust the bandwidth available to the network element 120 at the future times as predicted by the LSTM logic 160.

Figure 2:
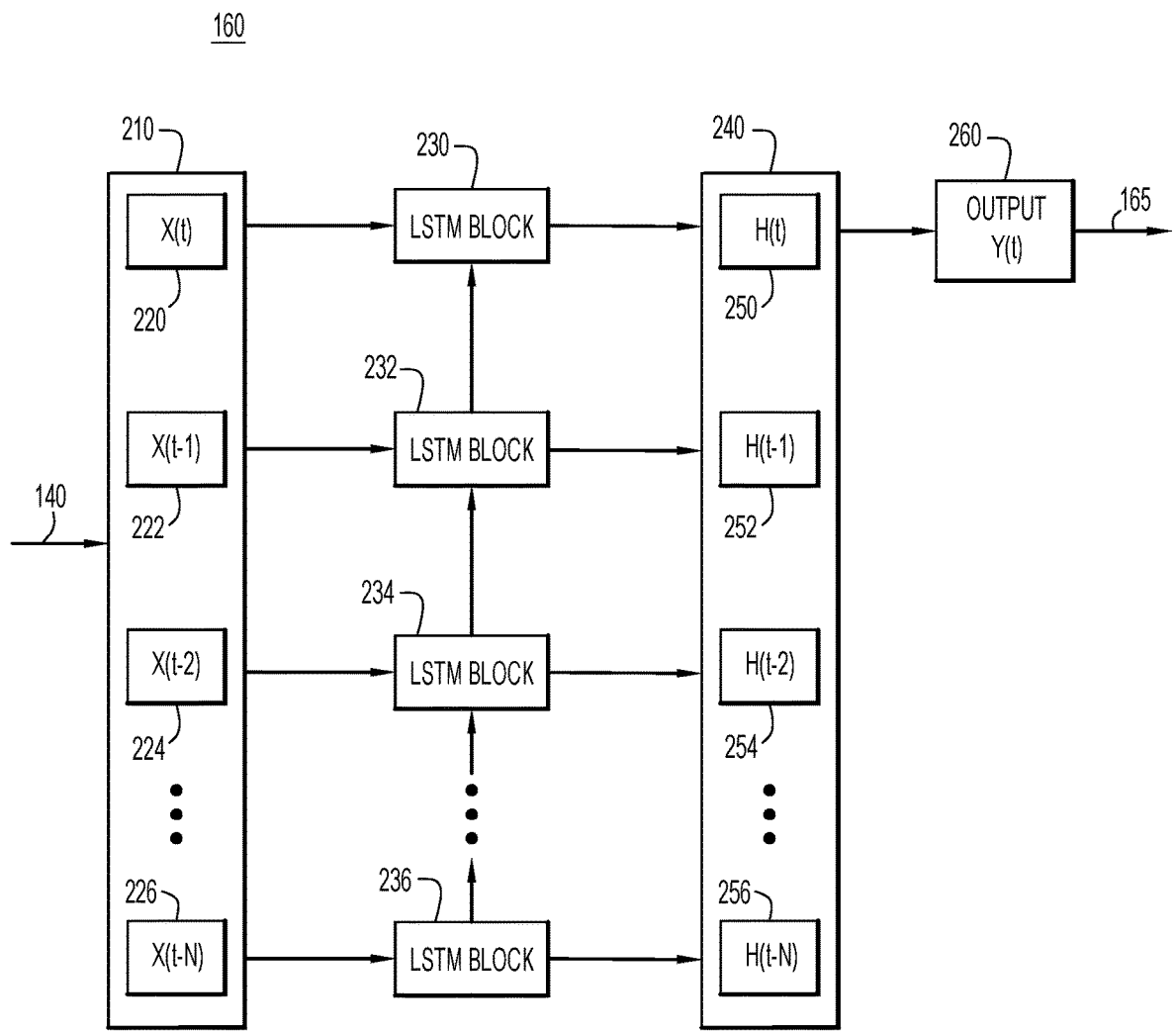
FIG. 2 is a simplified block diagram of a prediction engine that forecasts a future bandwidth value, according to an example embodiment.

Referring now to FIG. 2, a simplified block diagram of the LSTM logic 160 is shown. The LSTM logic 160 includes an input block 210 that receives N consecutive values of the traffic utilization data 140, where N defines a batch size to be processed by the LSTM logic 160. The first input value 220 is the value X of the total traffic used by the network element 120 at a time t, also described as X(t). The second input value 222 is the immediately previous value of the total traffic. i.e., X(t−1), and the third input value 224 is the value X(t−2). Similarly, the final input value 226 in the batch to be processed is the value X(t-N). Each of the input values 220-226 are input to a respective LSTM block 230-236. As a recurrent neural network, in addition to the input value received from the input block 210, each particular LSTM block 230-236 receives information from an LSTM block processing the input value immediately prior to the input value that the particular LSTM block is processing. In other words, LSTM block 230 receives input value 220 (i.e., corresponding to X(t)) and information from the LSTM block 232 (i.e., corresponding to X(t−1)).

Each LSTM block 230-236 provides an output value to the hidden layer output block 240. The first hidden layer output value 250, also described as H(t), corresponds to the output from the LSTM block 230 processing the input value 220 (i.e., corresponding to X(t)). Similarly, LSTM blocks 232, 234, and 236 provide hidden output values 252, 254, and 256, respectively. The hidden layer output block 240 provides each of the individual hidden layer outputs 250-256 to an output block 260. The output block 260 uses the hidden output 250 of the most recent time value to generate the predicted bandwidth 165, which is also described as Y(t), for a future time value. In other words, the value Y(t) is the predicted value of X(t+1).

During the training/validating of the neural network, the value Y(t) may be directly compared to the actual value of X(t+1) to refine the weights applied in each of the LSTM blocks 230-236. During the prediction phase, the actual value of X(t+1) is not already known, and Y(t) is the prediction of what the value of X(t+1) will be.

Figure 3:
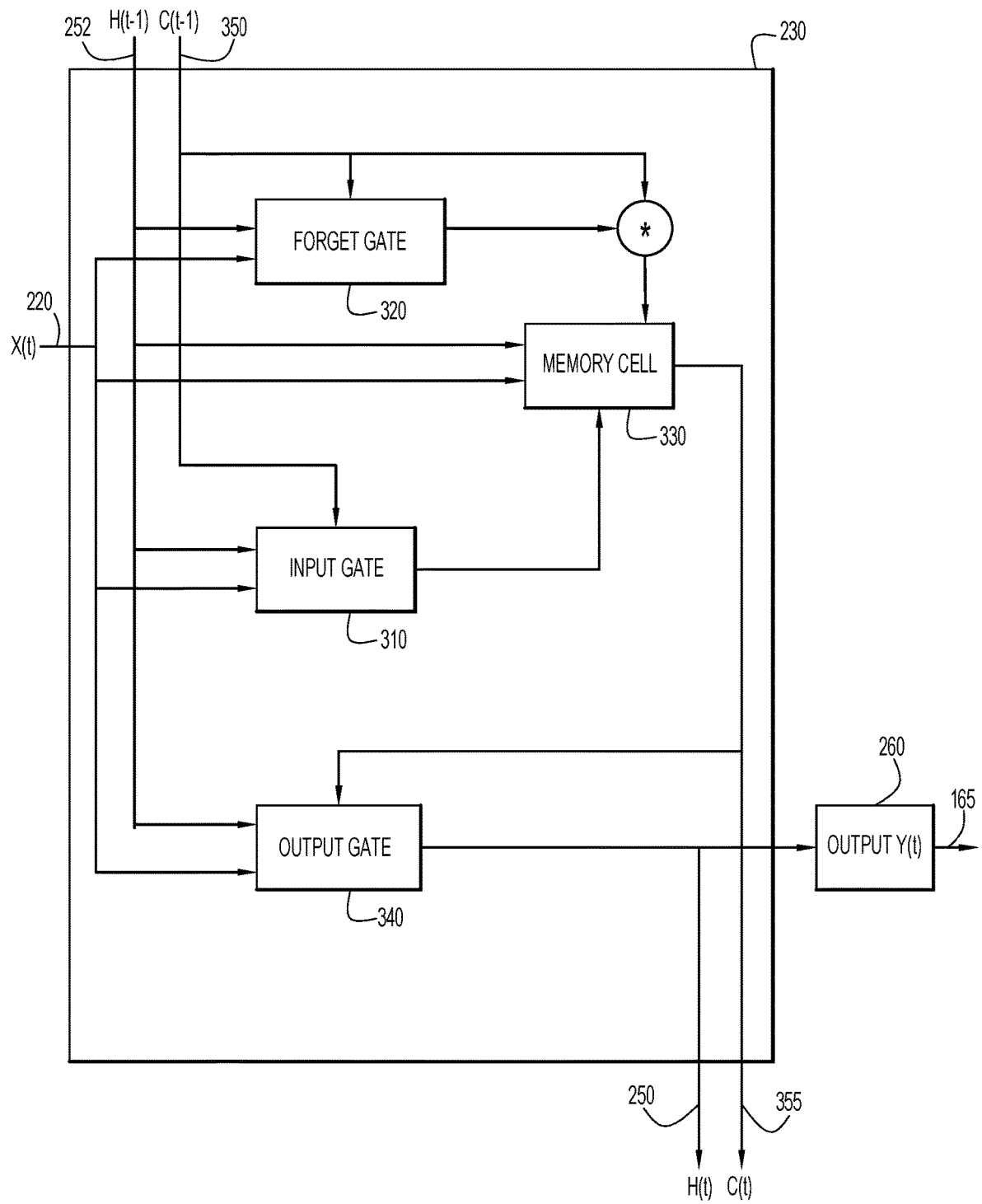
FIG. 3 is a simplified block diagram of a Long Short Term Memory (LSTM) block used in the prediction engine, according to an example embodiment.

Referring now to FIG. 3, a simplified block diagram of the logic in one LSTM block 230 is shown. The LSTM block 230 includes an input gate 310, a forget gate 320, a memory cell 330 and an output gate 340. As a unit, the LSTM block 230 receives the input value 220 (e.g., X(t)) from the input block 210 (as shown in FIG. 2) as well as the hidden output value 252 from the previous LSTM block (e.g., H(t−1)) and the memory cell state 350 from the previous LSTM block (e.g., C(t−1)). The LSTM block 230 produces an output of the hidden output value 250 (e.g., H(t)) and the memory cell state 355 (e.g., C(t)). Each of the input gate 310, the forget gate 320, the memory cell 330, and the output gate 340 take one or more of the input values and interact with each other to create the output values.

In one example, the forward pass expressions for each of the components of the LSTM block 230 is given by:

Input gate 310:

$$i(t)=g_i(x(t)\cdot W_{xi}+h(t-1)\cdot W_{hi}+c(t-1)\cdot W_{ci}+b_i), \quad (1)$$

Forget gate 320:

$$f(t)=g_f(x(t)\cdot W_{xf}+h(t-1)\cdot W_{hf}+c(t-1)\cdot W_{cf}+b_f), \quad (2)$$

Memory cell 330:

$$c(t)=f(t)\cdot c(t-1)+i(t)\cdot \tan h(x(t)\cdot W_{xc}+h(t-1)\cdot W_{hc}+b_c), \quad (3)$$

Output gate 340:

$$o(t)=g_o(x(t)\cdot W_{xo}+h(t-1)\cdot W_{ho}+c(t)\cdot W_{co}+b_o), \quad (4)$$

the hidden layer output 250:

$$h(t)=o(t)\cdot \tan h(c(t)), \quad (5)$$

which is passed to the output block 260 to generate the predicted bandwidth 165 according to:

$$y(t)=g_y(h(t)\cdot W_{hy}+b_y), \quad (6)$$

where $g_a(A)$ is a sigmoid function specific to element a, $W_{zq}$ is a weight matrix that connects element z to element q, and $b_z$ is a bias term for element z.

With these forward pass definitions, each of the weight functions $W_{zq}$ and the bias terms $b_z$ are variables that are optimized in the training phase of the LSTM-based neural network for a specific data set. In another example, the sigmoid function $g_a(A)$ for each element may also function as learning weights that are set in the training phase. In other words, the parameters $J_a$, $K_a$, and $L_a$ in the generalized sigmoid function shown in equation (7) are allowed to vary in the optimization of a gradient descent method during the training phase of the LSTM neural network.

$$g_a(A) = J_a + \frac{K_a}{1 + e^{-L_a A}} \quad (7)$$

In many neural network learning problems, the sigmoid function used to scale the response of each of the gates is manually selected. In the techniques presented herein, this process is automated by giving the parameters of the sigmoid function $g_a(A)$ as learning weights to the model, and allow the gradient descent process find the values $J_a$, $K_a$, and $L_a$ that fit the model best.

Figure 4:
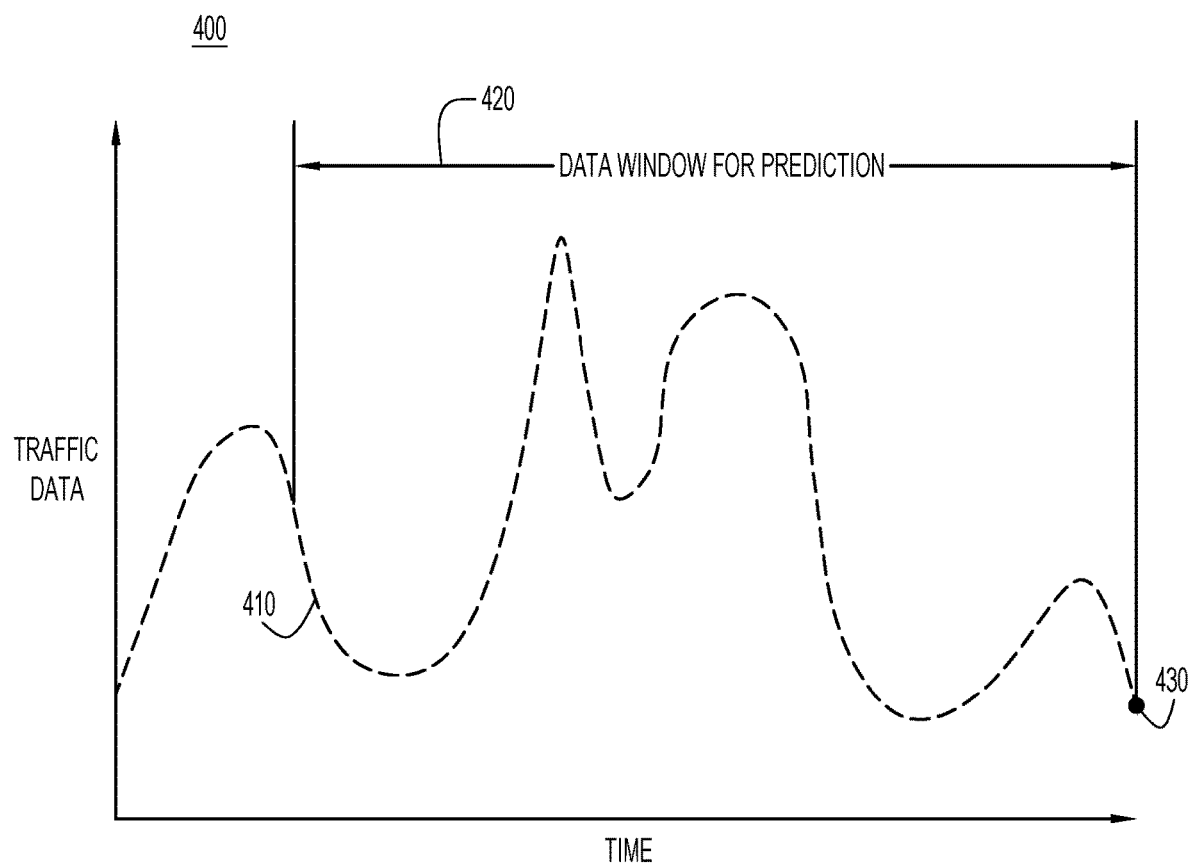
FIG. 4 is a diagram illustrating the window of past data used to predict a future data point, according to an example embodiment.

Referring now to FIG. 4, a graph 400 shows an example of traffic data in a network element used to predict the future bandwidth needs of the network element. The graph 400 shows a time series 410 that represent the total network traffic traversing a network element at specific times. In one example, a network element measures how much traffic (e.g., in packets, kilobytes, gigabits, etc.) the network element handles in a predetermined interval of time (e.g., 5 minutes). Each measure of traffic is represented as one of the points in the time series 410. A window 420 of past data points is processed with the LSTM neural network to predict the next data point 430 in the time series 410.

In one example, the window 420 may be defined by the past fifty measurements of network traffic. The fifty data points are given to the LSTM model (e.g., a neural network with a hidden layer of ten LSTM blocks) as inputs, and the model predicts the value of the next/subsequent data point. In other words, an instance of if an input and target from a training set may be represented as (ts[250:300], ts[301]), which has fifty points as inputs, and predicts the next immediate point. While fifty points is described as the length of data window 420, and ten LSTM blocks is described as the size of the hidden layer in the neural network, these parameters may be changed to fit the model for different applications. Training of the model may be done in as few as five epochs.

The LSTM model is described for one-step prediction, but it may be extended to predict more than one point at a time. After predicting a point, the point is added to the training set, and the model is updated by training on that point. This process may be repeated for each consecutive point that the model predicts.

Figure 5A:
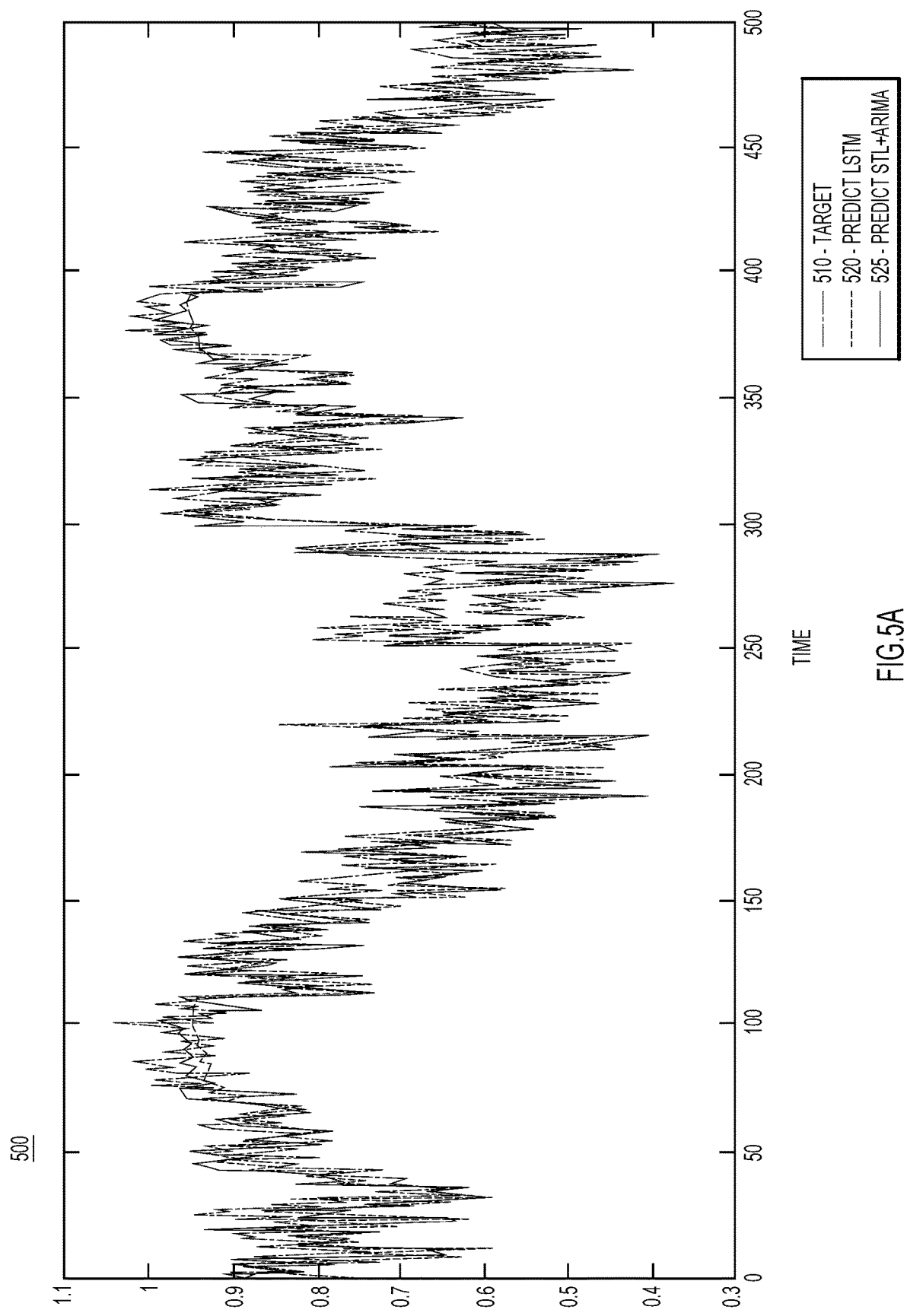
FIGS. 5A, 5B, and 5C are graphs of predictions of bandwidth utilization for different datasets and usage, according to an example embodiment.
Figure 5B:
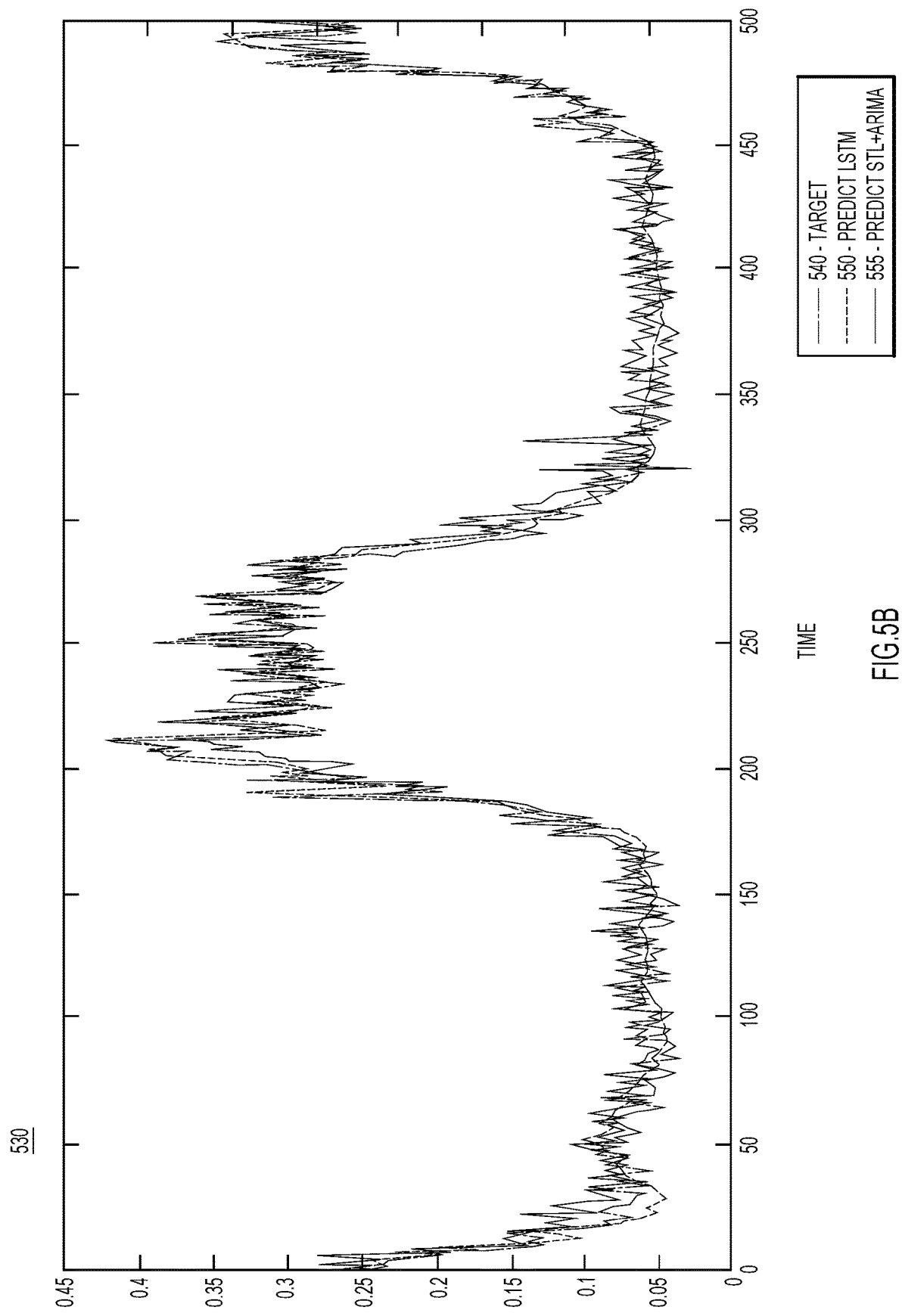
Figure 5C:
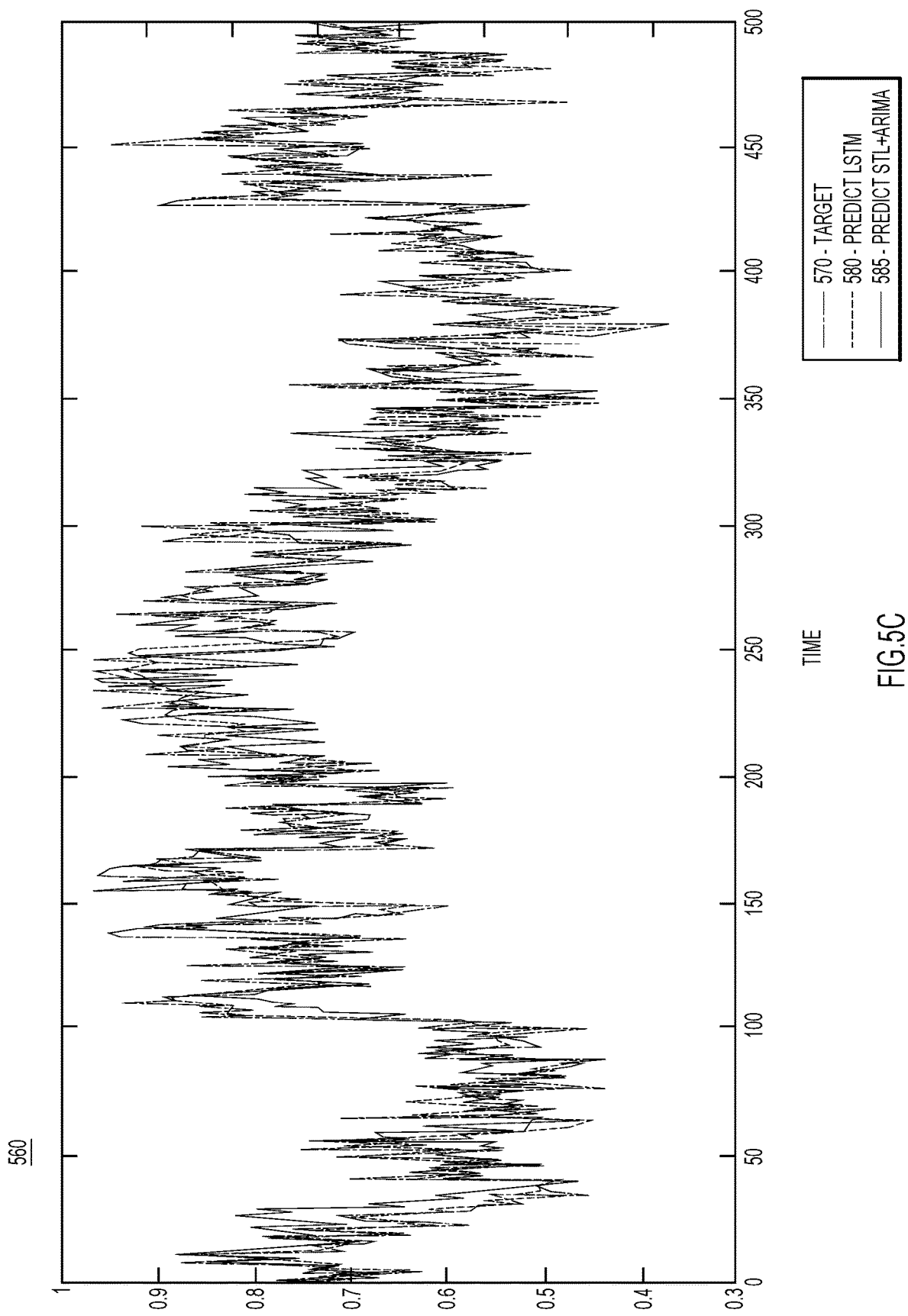

Referring now to FIGS. 5A, 5B, and 5C, predictions of a network usage from real-world data is shown using two different data sets in three scenarios. The datasets are obtained from a real-world source, and represent capacity usage and the Class-based Quality of Service (QoS) Class Map Volume. Each dataset is from a randomly selected router, and the data collection resolution is five minutes. The datasets are normalized by dividing all of the points by the maximum of the series.

The first scenario, shown in FIG. 5A, trains the models with two weeks (i.e., 4032 points) of data from the first dataset, and predicts the next five hundred points in a one-step fashion. The graph 500 shows the target values 510 that represent the actual values of network usage measured by the selected router, as well as the prediction 520 from the LSTM model described herein. The LSTM prediction 520 closely matches the target values 510, in contrast to the STL+ARIMA prediction 525, which deviates significantly for several segments of the prediction. In this scenario, the STL+ARIMA model is provided the correct period for the data (i.e., 2016 points or one week). Since the STL process requires at least two periods of data to function properly, this scenario provides two full periods (i.e., two weeks) of data.

The second scenario, shown in FIG. 5B, trains the models with two weeks (i.e., 4032 points) of data from the second dataset, and predicts the next five hundred points in a one-step fashion. The graph 530 shows the target values 540 that represent the actual values of network usage measured by the selected router, as well as the prediction 550 from the LSTM model described herein. The LSTM prediction 550 closely matches the target values 540, in contrast to the STL+ARIMA prediction 555, which deviates significantly for several segments of the prediction. In this scenario, the STL+ARIMA model is provided the correct period for the data (i.e., 2016 points or one week). Since the STL process requires at least two periods of data to function properly, this scenario provides two full periods (i.e., two weeks) of data.

The third scenario, shown in FIG. 5C, trains the models with twelve hours (i.e., 150 points) of data from the first dataset, and predicts the next five hundred points in a one-step fashion. The graph 560 shows the target values 570 that represent the actual values of network usage measured by the selected router, as well as the prediction 580 from the LSTM model described herein. The LSTM prediction 580 closely matches the target values 570, in contrast to the STL+ARIMA prediction 585, which deviates significantly for several segments of the prediction. In this scenario, the STL+ARIMA model only works if it is given the incorrect frequency for the data (i.e., six hours instead of one week) in order for the model to have two full periods of data to train.

Table 1 lists the Mean Squared Error (MSE) and Relative Absolute Error (RAE) for each of the three scenarios:

TABLE 1

Accuracy of LSTM and STL + ARIMA models

| | MSE LSTM | MSE STL + ARIMA | RAE LSTM | RAE STL + ARIMA |
|---|---|---|---|---|
| Scenario 1 | 0.00317 | 0.00797 | 0.059 | 0.110 |
| Scenario 2 | 0.00042 | 0.00080 | 0.134 | 0.211 |
| Scenario 3 | 0.00496 | 0.00702 | 0.078 | 0.099 |

In each of the three scenarios, the LSTM model outperforms the previously state-of-the-art STL+ARIMA model, as shown in Table 1.

Figure 6:
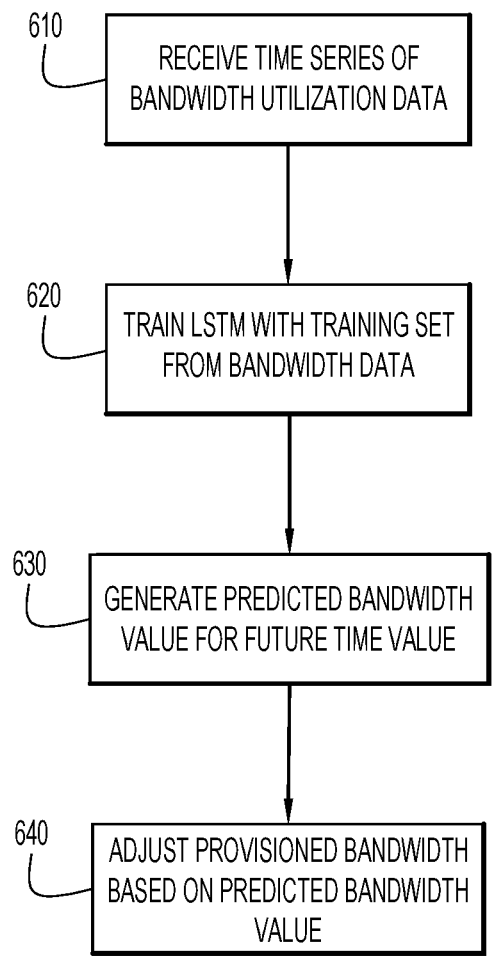
FIG. 6 is a flow chart illustrating the operations performed by a server to generate a predicted bandwidth value for a future time, according to an example embodiment.

Referring now to FIG. 6, a flow chart is shown that illustrates operations performed by a bandwidth provisioning server (e.g., server 150) in process 600 for predicting anticipated bandwidth needs of a network element. In step 610, the server receives a time series of bandwidth utilization data comprising a plurality of bandwidth values and time values corresponding to the bandwidth values. In one example, the time series of bandwidth values correspond to total traffic measured through a network element taken at fixed time intervals. In step 620, the server trains an LSTM neural network using at least a portion of the received time series. In one example, a training set of data and a validation set of data is determined from the time series of bandwidth values and used to train the LSTM neural network. The training set and validation set may overlap each other. In another example, the LSTM neural network may be trained with five epochs of the training set. In other words, the LSTM neural network may only require five passes through the training set to adjust randomly assigned weights to accurately predictive weights in the LSTM model.

In step 630, the server uses the trained LSTM neural network to predict the next bandwidth value in the time series. In one example, the trained LSTM neural network predicts the necessary bandwidth for the network element based on the fifty previous bandwidth values using ten LSTM blocks in a single layer for the LSTM model. In step 640, the server adjusts the bandwidth provisioned to the network element based on the predicted bandwidth value. In one example, the bandwidth of the network element may only be adjusted if the predicted bandwidth value differs from the currently available bandwidth by a predetermined amount. In other words, the bandwidth may only be adjusted if the predicted bandwidth requirement exceeds a percentage difference (e.g., 5%) of the currently provisioned bandwidth.

Figure 7:
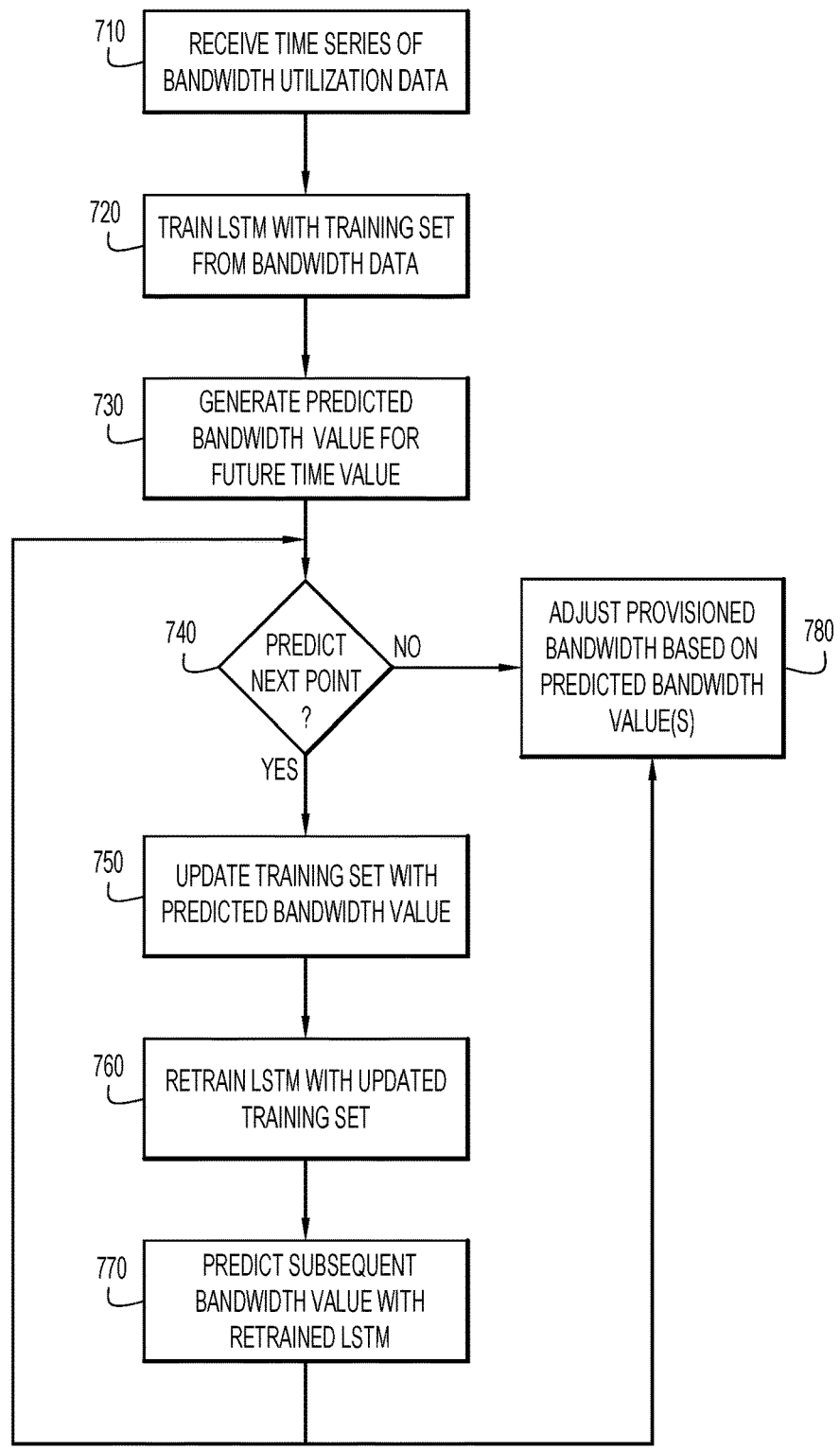
FIG. 7 is a flow chart illustrating the operations performed by a server to generate multiple bandwidth values for future time values, according to an example embodiment.

Referring now to FIG. 7, a flow chart is shown that illustrates operations performed by a bandwidth provisioning server (e.g., server 150) in process 700 for predicting anticipated bandwidth needs of a network element for a number of future points. In step 710, the server receives a time series of bandwidth utilization data comprising a plurality of bandwidth values and time values corresponding to the bandwidth values. In one example, the time series of bandwidth values correspond to total traffic measured through a network element taken at fixed time intervals. In step 720, the server trains an LSTM neural network using at least a portion of the received time series. In one example, a training set of data and a validation set of data is determined from the time series of bandwidth values and used to train the LSTM neural network. The training set and validation set may overlap each other.

In step 730, the server uses the trained LSTM neural network to predict the next bandwidth value in the time series. If the server is directed to predict the subsequent bandwidth value (i.e., after the bandwidth value predicted in step 730), as determined in step 740, then the server updates the training set in step 750 with the predicted bandwidth value generated in step 730. In step 760, the server retrains the LSTM neural network to account for the previously predicted bandwidth value. The server predicts the subsequent bandwidth value using the retrained LSTM neural network in step 770, and returns to step 740 to determine if the next point in the bandwidth value time series is to be predicted.

Once the server has predicted a predetermined number of future bandwidth values in a one-step fashion, the server adjusts the provisioned bandwidth based on the predicted bandwidth values in step 780. Alternatively, the server may adjust the provisioned bandwidth for the network element after predicting each bandwidth value, providing a rolling update to the provisioned bandwidth for the network element.

Figure 8:
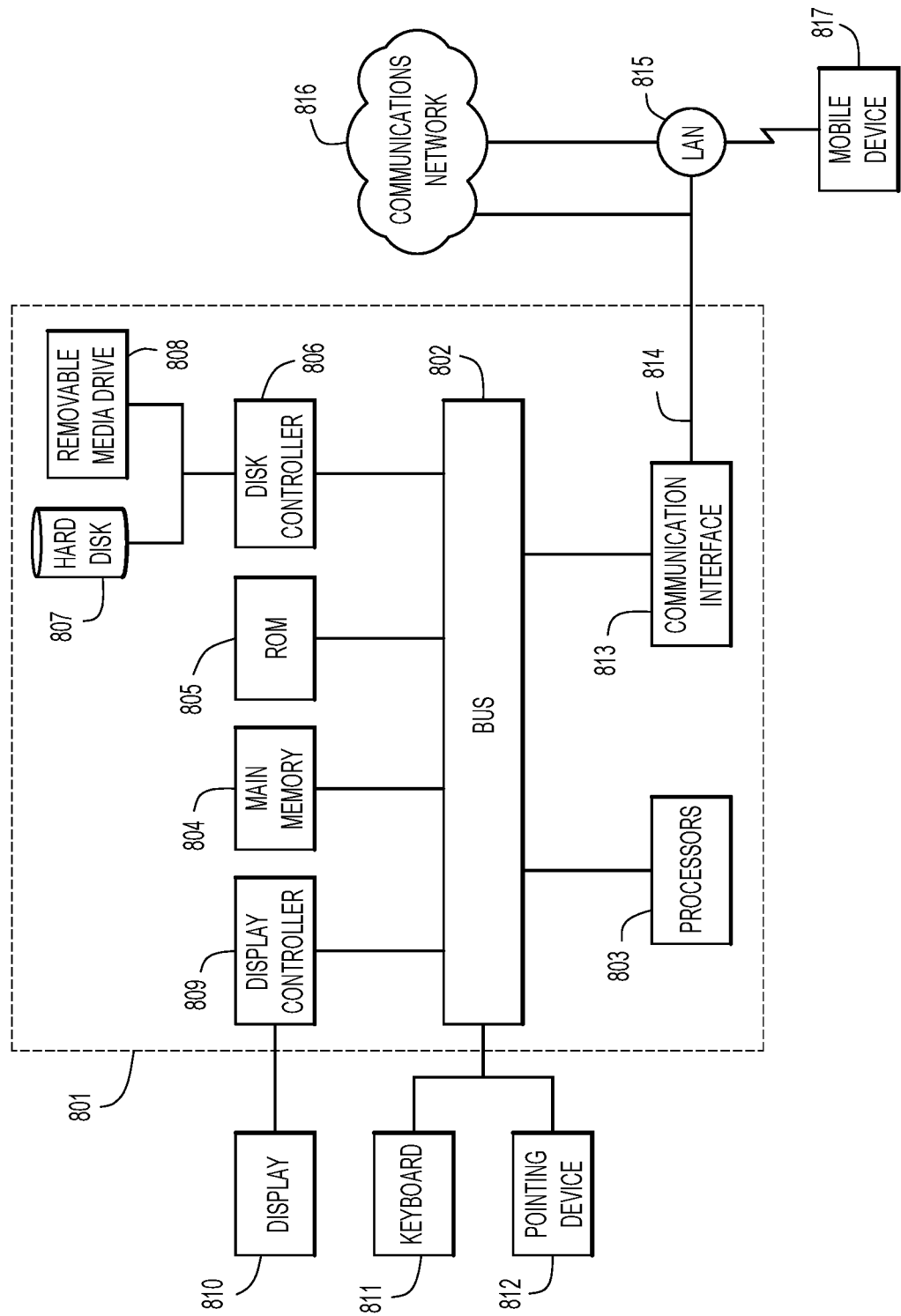
FIG. 8 is a simplified block diagram of a device that that may be configured to perform methods presented herein, according to an example embodiment.

Referring now to FIG. 8, an example of a computer system 801 (e.g., server 150) upon which the embodiments presented may be implemented is shown. The computer system 801 may be programmed to implement a computer based device, such as a bandwidth provisioning system of a software defined network. The computer system 801 includes a bus 802 or other communication mechanism for communicating information, and a processor 803 coupled with the bus 802 for processing the information. While the figure shows a single block 803 for a processor, it should be understood that the processors 803 may represent a plurality of processing cores, each of which can perform separate processing. The computer system 801 also includes a main memory 804, such as a random access memory (RAM) or other dynamic storage device (e.g., dynamic RAM (DRAM), static RAM (SRAM), and synchronous DRAM (SD RAM)), coupled to the bus 802 for storing information and instructions to be executed by processor 803. In addition, the main memory 804 may be used for storing temporary variables or other intermediate information during the execution of instructions by the processor 803.

The computer system 801 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computer system 801 also includes a disk controller 806 coupled to the bus 802 to control one or more storage devices for storing information and instructions, such as a magnetic hard disk 807, and a removable media drive 808 (e.g., floppy disk drive, read-only compact disc drive, read/write compact disc drive, compact disc jukebox, tape drive, and removable magneto-optical drive, solid state drive, etc.). The storage devices may be added to the computer system 801 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 801 may also include a display controller 809 coupled to the bus 802 to control a display 810, such as a cathode ray tube (CRT), liquid crystal display (LCD) or light emitting diode (LED) display, for displaying information to a computer user. The computer system 801 includes input devices, such as a keyboard 811 and a pointing device 812, for interacting with a computer user and providing information to the processor 803. The pointing device 812, for example, may be a mouse, a trackball, track pad, touch screen, or a pointing stick for communicating direction information and command selections to the processor 803 and for controlling cursor movement on the display 810. In addition, a printer may provide printed listings of data stored and/or generated by the computer system 801.

The computer system 801 performs a portion or all of the processing steps of the operations presented herein in response to the processor 803 executing one or more sequences of one or more instructions contained in a memory, such as the main memory 804. Such instructions may be read into the main memory 804 from another computer readable storage medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computer system 801 includes at least one computer readable storage medium or memory for holding instructions programmed according to the embodiments presented, for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 801, for driving a device or devices for implementing the operations presented herein, and for enabling the computer system 801 to interact with a human user (e.g., a network administrator). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 801 also includes a communication interface 813 coupled to the bus 802. The communication interface 813 provides a two-way data communication coupling to a network link 814 that is connected to, for example, a local area network (LAN) 815, or to another communications network 816 such as the Internet. For example, the communication interface 813 may be a wired or wireless network interface card to attach to any packet switched (wired or wireless) LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to another computer through a local are network 815 (e.g., a LAN) or through equipment operated by a service provider, which provides communication services through a communications network 816. The local network 814 and the communications network 816 use, for example, electrical, electromagnetic, or optical signals that carry digital data streams, and the associated physical layer (e.g., CAT 5 cable, coaxial cable, optical fiber, etc.). The signals through the various networks and the signals on the network link 814 and through the communication interface 813, which carry the digital data to and from the computer system 801 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 801 can transmit and receive data, including program code, through the network(s) 815 and 816, the network link 814 and the communication interface 813. Moreover, the network link 814 may provide a connection through a LAN 815 to a mobile device 817 such as a personal digital assistant (PDA), tablet computer, laptop computer, or cellular telephone.

In summary, the techniques presented herein train an LSTM neural network on a set of network traffic data points (e.g., historic data), and then use the LSTM neural network for a series of one-step predictions on completely new points, and predict the bandwidth values for the new points.

In contrast to other neural networks or statistical methods, such as STL+ARIMA, the techniques presented herein using an LSTM model presents several advantages. In particular, the LSTM methods described herein are more accurate than STL+ARIMA methods, and work without any knowledge of the data frequency. In order for STL+ARIMA to function accurately, the correct frequency/period must be fed into the model. With the wrong value of the frequency, the accuracy of STL+ARIMA suffers in contrast to the LSTM methods described herein.

Additionally, the LSTM methods presented herein do not require any pre-processing steps. In contrast, STL+ARIMA methods first subtract seasonality and trend components from the data, and then ARIMA models are used to predict the residual. This process is time consuming and adds noise to the residual due to imperfect de-seasonalizing and de-trending methods. The LSTM methods work without any pre-processing steps.

Further, STL-based techniques do not work on datasets with lengths smaller than two periods of the data. For example, if the period of the data is one day, STL-based methods require at least two days of data to properly function. The LSTM methods described herein would provide accurate predictions for the same data set with less than eight hours of data as its training set.

Finally, the LSTM methods presented herein are faster than STL+ARIMA when used in a streaming fashion, since the LSTM model is trained once and only updated with the new data points when they arrive. In contrast, current STL+ARIMA methods use the whole dataset again to predict the next point.

Advantages of the LSTM methods presented over other neural network methods include higher accuracy, especially when seasonality components with long-term dependencies exist. In other words, one advantage of LSTM to ordinary neural networks is its ability to infer long-term dependencies between data points, and learning to forget those data points that are not important. The ability to forget allows the LSTM neural network to adapt to changes in the computer network configuration without having to reconfigured the neural network. The LSTM learns that changed configuration as part of the training phase, and essentially forgets the old configuration.

Additionally, most neural network methods require a huge number of data points to learn and infer relationships, i.e., they are "data-hungry." However, the LSTM methods presented herein work well with a smaller dataset. In the absence of large datasets, standard neural networks may be trained with a higher number of epochs. While some neural networks are trained for 700 epochs, the LSTM methods presented herein function well with only five epochs of training.

Further, many neural network methods require large network comprising multiple layers of neurons to achieve adequate performance. While standard neural network require three hidden layers with multiple units in each layer, the LSTM methods presented herein function well with a single layer of ten LSTM units. This significantly reduces the cost of learning in terms of CPU and memory usage, as well as time.

Further still, the LSTM methods presented herein accept real valued inputs and provide real valued output predictions. In contrast, other neural network and statistical models typically decompose the input data (e.g., to remove trends and seasonality) and output a discrete state. In other words, other models may predict features of the future values of a data set, but will not typically predict specific numerical values, such as bandwidth requirements.

In one form, a method is provided for a server to predict a bandwidth value for a network element using past traffic data using an LSTM neural network. The method comprises receiving a time series of bandwidth utilization of the computer network element. The time series comprises a plurality of bandwidth values each associated with a respective time value. An LSTM neural network is trained with a training set comprising at least a portion of the time series. The server generates a predicted bandwidth value associated with a future time value based on the LSTM neural network. The provisioned bandwidth for the computer network element is adjusted based on the predicted bandwidth value.

In another form, an apparatus is provided comprising a network interface, an LSTM neural network, and a processor. The network interface unit is configured to communicate with computer network elements in a computer network. The LSTM neural network is configured to process a time series of bandwidth utilization received via the network interface unit. The time series comprises a plurality of bandwidth values each associated with a respective time value. The processor is configured to train the LSTM neural network with a training set comprising a portion of the time series. The processor is also configured to generate a predicted bandwidth value associated with a future time value based on the LSTM neural network. The processor is further configured to adjust a provisioned bandwidth for at least one of the computer network elements based on the predicted bandwidth value.

In a further form, a non-transitory computer readable storage media is provided that is encoded with instructions that, when executed by a processor, cause the processor to perform any of the methods described and shown herein.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A computer-implemented method comprising:
receiving a time series of measured bandwidth utilization of a computer network element, the time series comprising a plurality of measured bandwidth values each associated with a respective time value;
training a Long Short Term Memory (LSTM) neural network with a training set comprising at least a portion of the time series of measured bandwidth utilization;
iteratively predicting a subsequent bandwidth value by:
generating a predicted bandwidth value associated with a next respective time value in the time series, wherein the predicted bandwidth value is generated based on the LSTM neural network;
generating a subsequent training set by updating the training set with the predicted bandwidth value associated with the next respective time value, the subsequent training set including the predicted bandwidth value in association with the next respective time value and at least a portion of the training set comprising the measured bandwidth utilization; and
retraining the LSTM neural network with the subsequent training set; and
adjusting a provisioned bandwidth for the computer network element based on the subsequent bandwidth value iteratively predicted using the retrained LSTM neural network.

2. The method of claim 1, wherein the training set comprises raw bandwidth data without any decomposition.

3. The method of claim 1, wherein the LSTM neural network is trained with the training set without removing a periodic seasonality.

4. The method of claim 1, wherein the LSTM neural network comprises a plurality of blocks, each block comprising an input gate, a forget gate, a memory cell, and an output gate.

5. The method of claim 4, wherein a state of a particular block of the LSTM neural network at a time t given an input x(t) is defined by:

$i(t)=g_i(x(t) \cdot W_{xi}+h(t-1) \cdot W_{hi}+c(t-1) \cdot W_{ci}+b_i)$ $f(t)=g_f(x(t) \cdot W_{xf}+h(t-1) \cdot W_{hf}+c(t-1) \cdot W_{cf}+b_f)$ $c(t)=f(t) \cdot c(t-1)+i(t) \cdot \tan h(x(t) \cdot W_{sc}+h(t-1) \cdot W_{hc}+b_c)$ $o(t)=g_o(x(t) \cdot W_{xo}+h(t-1) \cdot W_{ho}+c(t) \cdot W_{co}+b_o)$ $h(t)=o(t) \cdot \tan h(c(t))$ $y(t)=g_y(h(t) \cdot W_{hy}+b_y),$ where $g_a(A)$ is a sigmoid function, i(t) is an input gate state, f(t) is a forget gate state, c(t) is a memory cell state, o(t) is an output gate state, h(t) is a hidden layer output, y(t) is an output of the particular block, $W_{zq}$ is a weight matrix that connects element z to element q, and $b_z$ is a bias term for element z.

6. The method of claim 5, wherein the sigmoid function $g_a(A)$ is defined by:

$$g_a(A) = J_a + \frac{K_a}{1+e^{-L_a A}},$$

where $J_a$, $K_a$, and $L_a$ are parameters determined by the training of the LSTM neural network.

7. An apparatus comprising:
a network interface unit configured to communicate with computer network elements in a computer network;
a Long Short Term Memory (LSTM) neural network configured to process a time series of measured bandwidth utilization received via the network interface unit, the time series comprising a plurality of measured bandwidth values each associated with a respective time value; and
a processor configured to:
train the LSTM neural network with a training set comprising at least a portion of the time series of measured bandwidth utilization;
iteratively predict a subsequent bandwidth value by:
generating a predicted bandwidth value associated with a next respective time value in the time series, wherein the processor generates the predicted bandwidth value based on the LSTM neural network;
generating a subsequent training set by updating the training set with the predicted bandwidth value associated with the next respective time value, the subsequent training set including the predicted bandwidth value in association with the next respective time value and at least a portion of the training set comprising the measured bandwidth utilization; and
retraining the LSTM neural network with the subsequent training set; and
adjust a provisioned bandwidth for at least one of the computer network elements based on the subsequent bandwidth value iteratively predicted using the retrained LSTM neural network.

8. The apparatus of claim 7, wherein the processor is configured to train the LSTM neural network with the training set without removing a periodic seasonality.

9. The apparatus of claim 7, wherein the training set comprises raw bandwidth data without any decomposition.

10. The apparatus of claim 7, wherein the LSTM neural network comprises a plurality of blocks, each block comprising an input gate, a forget gate, a memory cell, and an output gate.

11. The apparatus of claim 10, wherein a state of a particular block of the LSTM neural network at a time t given an input x(t) is defined by:

$i(t)=g_i(x(t) \cdot W_{xi}+h(t-1) \cdot W_{hi}+c(t-1) \cdot W_{ci}+b_i)$ $f(t)=g_f(x(t) \cdot W_{xf}+h(t-1) \cdot W_{hf}+c(t-1) \cdot W_{cf}+b_f)$ $c(t)=f(t) \cdot c(t-1)+i(t) \cdot \tan h(x(t) \cdot W_{sc}+h(t-1) \cdot W_{hc}+b_c)$ $o(t)=g_o(x(t) \cdot W_{xo}+h(t-1) \cdot W_{ho}+c(t) \cdot W_{co}+b_o)$ $h(t)=o(t) \cdot \tan h(c(t))$ $y(t)=g_y(h(t) \cdot W_{hy}+b_y),$ where $g_a(A)$ is a sigmoid function, i(t) is an input gate state, f(t) is a forget gate state, c(t) is a memory cell state, o(t) is an output gate state, h(t) is a hidden layer output, y(t) is an output of the particular block, $W_{zq}$ is a weight matrix that connects element z to element q, and $b_z$ is a bias term for element z.

12. The apparatus of claim 11, wherein the sigmoid function $g_a(A)$ is defined by:

$$g_a(A) = J_a + \frac{K_a}{1 + e^{-L_a A}},$$

where $J_a$, $K_a$, and $L_a$ are parameters determined by the training of the LSTM neural network.

13. One or more non-transitory computer readable storage media encoded with computer executable instructions operable to cause a processor to:
receive a time series of measured bandwidth utilization of a computer network element, the time series comprising a plurality of measured bandwidth values each associated with a respective time value;
train a Long Short Term Memory (LSTM) neural network with a training set comprising at least a portion of the time series of measured bandwidth utilization;
iteratively predict a subsequent bandwidth value by:
  generating a predicted bandwidth value associated with a next respective time value in the time series, wherein the predicted bandwidth value is generated based on the LSTM neural network;
  generating a subsequent training set by updating the training set with the predicted bandwidth value associated with the next respective time value, the subsequent training set including the predicted bandwidth value in association with the next respective time value and at least a portion of the training set comprising the measured bandwidth utilization; and
  retraining the LSTM neural network with the subsequent training set; and
adjust a provisioned bandwidth for the computer network element based on the subsequent bandwidth value iteratively predicted using the retrained LSTM neural network.

14. The computer readable storage media of claim 13, wherein the training set comprises raw bandwidth data without any decomposition.

15. The computer readable storage media of claim 13, wherein the LSTM neural network comprises a plurality of blocks, each block comprising an input gate, a forget gate, a memory cell, and an output gate.

16. The computer readable storage media of claim 15, wherein a state of a particular block of the LSTM neural network at a time t given an input x(t) is defined by:

$$i(t)=g_i(x(t)\cdot W_{xi}+h(t-1)\cdot W_{hi}+c(t-1)\cdot W_{ci}+b_i)$$

$$f(t)=g_f(x(t)\cdot W_{xf}+h(t-1)\cdot W_{hf}+c(t-1)\cdot W_{cf}+b_f)$$

$$c(t)=f(t)\cdot c(t-1)+i(t)\cdot \tan h(x(t)\cdot W_{sc}+h(t-1)\cdot W_{hc}+b_c)$$

$$o(t)=g_o(x(t)\cdot W_{xo}+h(t-1)\cdot W_{ho}+c(t)\cdot W_{co}+b_o)$$

$$h(t)=o(t)\cdot \tan h(c(t))$$

$$y(t)=g_y(h(t)\cdot W_{hy}+b_y),$$

where $g_a(A)$ is a sigmoid function, i(t) is an input gate state, f(t) is a forget gate state, c(t) is a memory cell state, o(t) is an output gate state, h(t) is a hidden layer output, y(t) is an output of the particular block, $W_{zq}$ is a weight matrix that connects element z to element q, and $b_z$ is a bias term for element z.

17. The computer readable storage media of claim 16, wherein the sigmoid function $g_a(A)$ is defined by:

$$g_a(A) = J_a + \frac{K_a}{1 + e^{-L_a A}},$$

where $J_a$, $K_a$, and $L_a$ are parameters determined by the training of the LSTM neural network.

* * * * *